United States Patent [19]

Seki

[11] Patent Number: 4,546,423
[45] Date of Patent: Oct. 8, 1985

[54] MULTIPLE INVERTERS WITH OVERCURRENT AND SHOOT-THROUGH PROTECTION

[75] Inventor: Nagataka Seki, Tokyo, Japan

[73] Assignee: Tokyo Shibaura Denki Kabushiki Kaisha, Kawasaki, Japan

[21] Appl. No.: 466,541

[22] Filed: Feb. 15, 1983

[30] Foreign Application Priority Data

Feb. 23, 1982 [JP] Japan .................................. 57-26817
Jun. 25, 1982 [JP] Japan ................................ 57-109533

[51] Int. Cl.⁴ ........................................... H02H 7/122
[52] U.S. Cl. ...................................... 363/56; 363/58; 363/71
[58] Field of Search ...................... 307/82; 363/50, 55, 363/56, 57, 58, 65, 71, 72; 361/87, 100

[56] References Cited

U.S. PATENT DOCUMENTS

| | | | |
|---|---|---|---|
| 3,530,360 | 9/1970 | Relation | 363/56 |
| 3,621,365 | 11/1971 | Beck | 363/71 |
| 3,792,286 | 2/1974 | Meier | 363/71 |
| 3,818,272 | 6/1974 | Rich | 363/57 |

FOREIGN PATENT DOCUMENTS

| | | |
|---|---|---|
| 1161639 | 1/1964 | Fed. Rep. of Germany . |
| 1488859 | 4/1969 | Fed. Rep. of Germany . |
| .5746718 | 8/1976 | Japan . |
| 5736833 | 7/1977 | Japan . |
| 2005495 | 4/1979 | United Kingdom . |
| 2022346 | 12/1979 | United Kingdom . |

Primary Examiner—William H. Beha, Jr.
Assistant Examiner—Jeffrey Sterrett
Attorney, Agent, or Firm—Oblon, Fisher, Spivak, McClelland & Maier

[57] ABSTRACT

A multiple inverter has an input shut-off circuit receiving a DC energy input and providing two DC outputs; two unit inverters coupled to the input shut-off circuit, each including switching elements, for respectively converting the DC outputs into two AC outputs; and a control circuit coupled to the unit inverters for detecting an accidental overcurrent due to a shoot-through of the switching elements, and turning off the unit inverters. The input shut-off circuit includes circuit elements for interrupting a current path of the DC energy input when the control circuit detects the accidental or faulty overcurrent.

17 Claims, 24 Drawing Figures

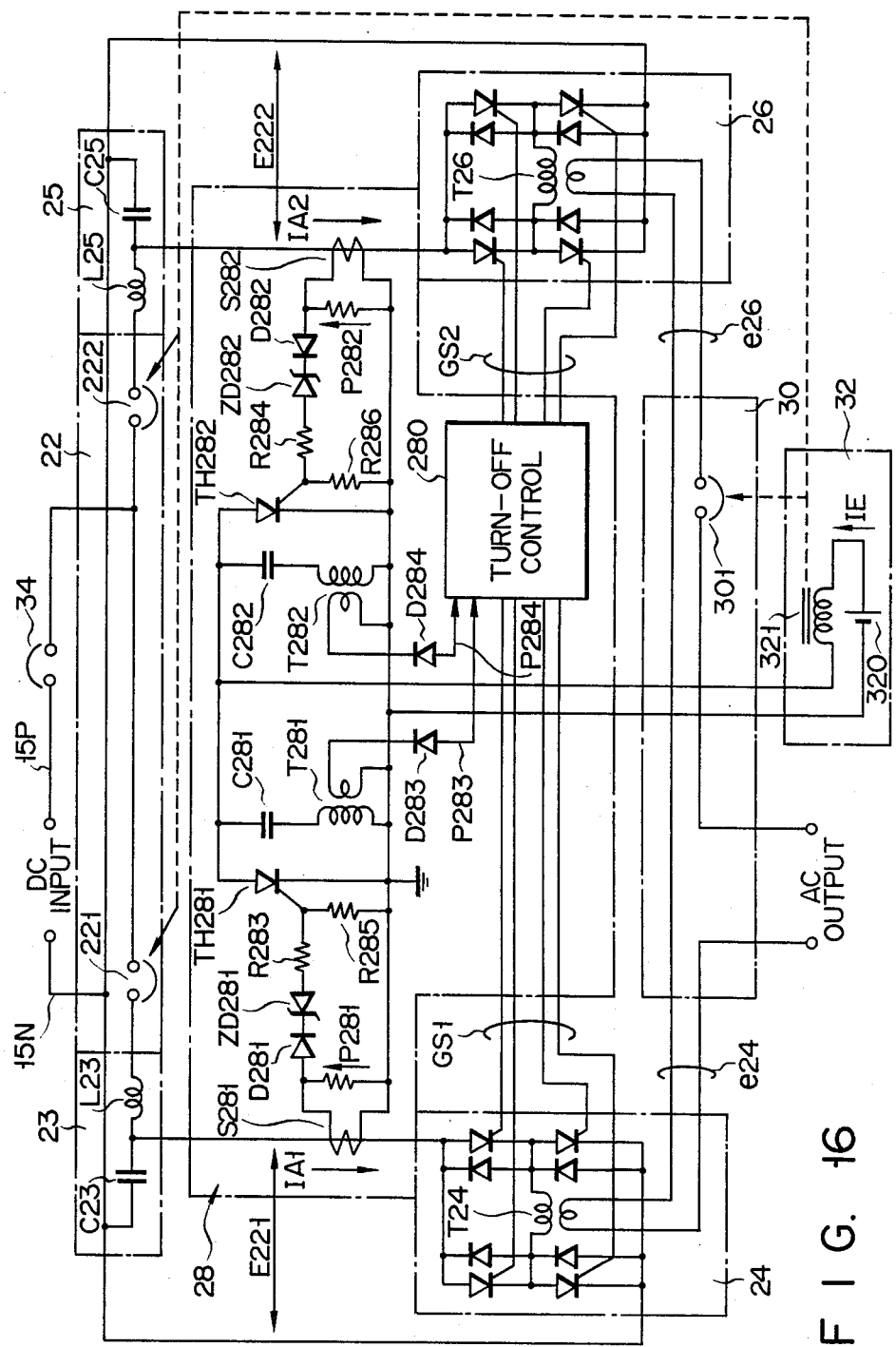
F I G. 16

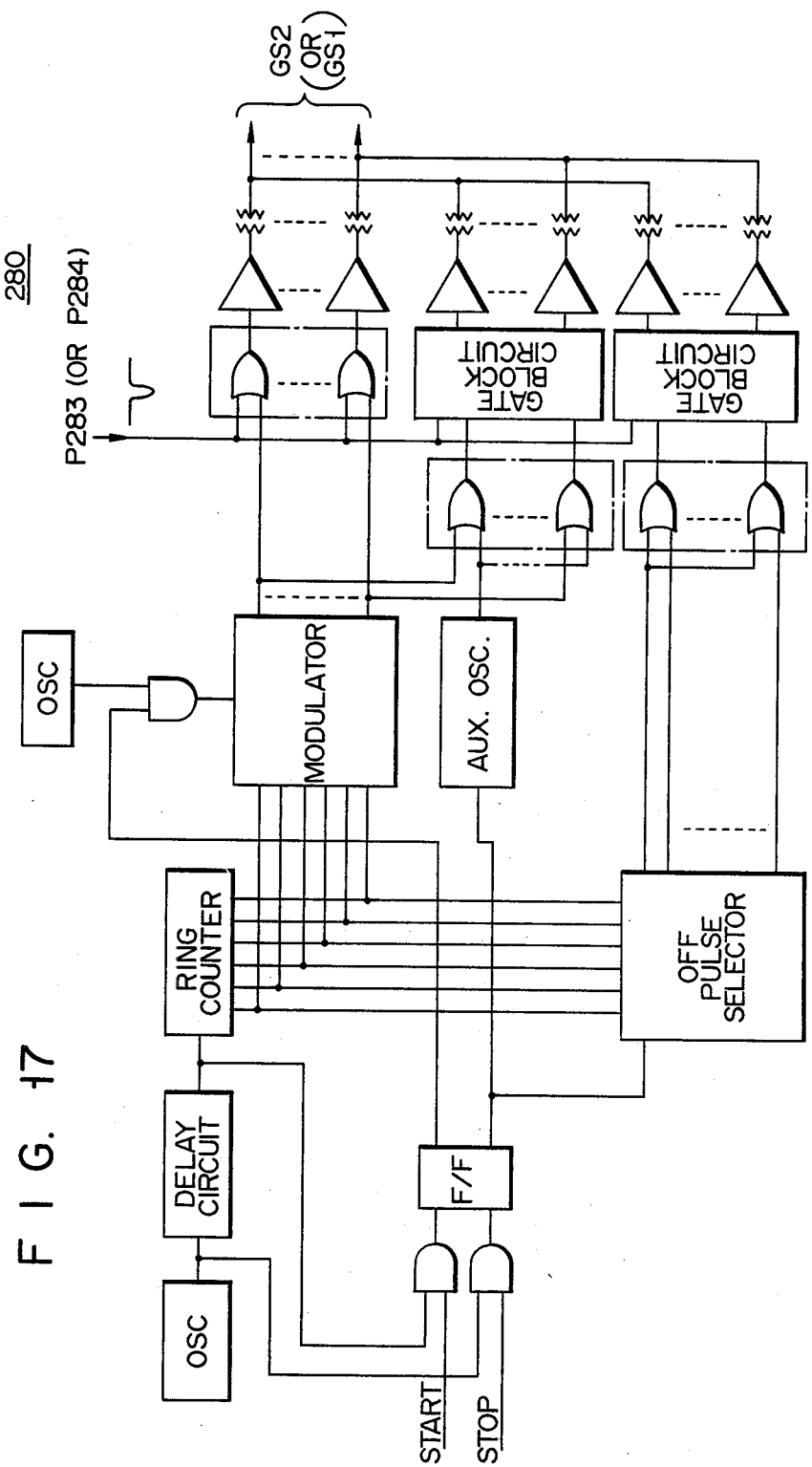
F I G. 17

MULTIPLE INVERTERS WITH OVERCURRENT AND SHOOT-THROUGH PROTECTION

BACKGROUND OF THE INVENTION

This invention relates to a multiple inverter formed of a plurality of unit inverters in which an accidental or faulty overcurrent flow in the inverter circuit is prevented.

FIG. 1 shows a typical configuration of a prior art multiple inverter. An AC input voltage is applied via a breaker 10 to a rectifier (AC to DC converter) 12. Ripples of an output voltage of rectifier 12 are filtered out via an LC filter 13. The filtered DC output voltage from the LC filter 13 is applied to DC lines 15P and 15N. Two unit inverters 14 and 16 are connected in parallel to DC lines 15P and 15N. Each of the unit inverters 14 and 16 converts the inputted DC voltage into an AC output voltage. The AC output of unit inverter 14 is connected in series with the AC output of unit inverter 16, and the serially connected AC outputs of inverters 14 and 16 are applied via a high-speed circuit breaker 18 to a load 20 which may contain a counter-electromotive force source or any other electric power source. Where three or more unit inverters are used in a special case, the output of these unit inverters may be connected in series and/or parallel. An apparatus of such serially and/or parallel connected (stacked) unit inverters is called a multiple inverter. Multiple inverters are widely used where a large power-handling capacity is required or a low-distortion AC output is required.

FIG. 2 shows details of the configuration of conventional unit inverters. A positive DC line 15P is coupled via a series circuit of GTO (gate-turn-off) thyristors 141 and 142 to a negative DC line 15N. Line 15P is also coupled to line 15N via a series circuit of GTO thyristors 143 and 144. Diodes D141 to D144 are respectively anti-parallel-connected to thyristors 141 to 144. The juncture of thyristors 141 and 142 is coupled via a primary winding of an output transformer T14 to the juncture of thyristors 143 and 144. The elements 141–144, D141–D144 and T14 constitute a first unit inverter 14. A second unit inverter 16 coupled parallel to the first unit inverter 14 has the same configuration as the unit inverter 14.

When thyristors 141 and 144 are on and thyristors 142 and 143 are off, a positive DC potential $+E$ of lines 15P and 15N is applied to a terminal U1 of the primary of transformer T14. Whereas, when thyristors 142 and 143 are on and thyristors 141 and 144 are off, a negative DC potential $-E$ of lines 15P and 15N is applied to the terminal U1. When thyristors 141 and 143 or thyristors 142 and 144 are on, terminals U1 and V1 of the primary of transformer T14 is short-circuited through the conducting thyristors, and no potential difference appears across the terminals U1 and V1. Thus, when thyristors 141–144 are on-off controlled in a suitable sequence and in a prescribed frequency, a variable AC output voltage e14 is outputted from terminals u1 and v1 of the secondary of transformer T14.

Similarly, a variable AC output voltage e16 is outputted from terminals u2 and v2 of the secondary of a transformer T16 in the second unit inverter 16.

A turn-off control or commutation control for GTO thyristors is known. Therefore, illustrations of circuit configurations for the turn-off/commutation control are omitted.

A prior art multiple inverter requires an expensive high-speed breaker 18 which can cut off the output current path of unit inverters within a short period less than about $0.1f$ (here f denotes the AC output frequency of the multiple inverter). Such a high-speed breaker 18 generally consists of a thyristor electronic switch.

Now, the reason why a high-speed breaker 18 is required will be discussed. Suppose that a shoot-through (commutation-failure) occurs during the actuation of a multiple inverter. Here, the "shoot-through" means that, for instance, thyristor 142 is turned on before thyristor 141 is turned off, resulting in short-circuiting the DC power lines 15P and 15N. When such a shoot-through occurs, even if a reactor (inductor or retardation coil) is connected in series with unit inverter 14, a large discharge current of a thousand amperes could flow from a capacitor C into inverter 14. When the load 20 includes an energy source such as another inverter or a synchronous motor (which may function as an AC generator), an excessive overcurrent may flow from the load 20 side into inverter 14. This is because the impedance of said reactor is very small. Generally, the power-handling capacity of the GTO thyristors used for unit inverter 14 (or 16) is not large enough to escape a secondary breakdown due to such a large discharge current. Therefore, such a large current (overcurrent) is undesirable and should be avoided. The high-speed breaker 18 is therefore necessary to quickly shut-off such an overcurrent flow when a shoot-through occurs.

In practice, it is commonly thought that if no problem due to an overcurrent occurs, a low-speed type breaker is more suitable for the breaker 18 than a high-speed type in view of the manufacturing costs.

Another known approach for avoiding an accidental or faulty overcurrent is a thyristor-turn-off method in which all normal thyristors of the multiple inverter are forcibly turned off when any shoot-through occurs.

However, where the DC input circuits of unit inverters 14 and 16 are connected in parallel as shown in FIG. 2, a large secondary AC current could accidentaly flow when an accident such as a shoot-through occurs. For instance, where thyristors 141, 142 and 144 are simultaneously turned on due to the shoot-through and thyristors 161 to 164 are all turned off by the thyristor-turn-off method, short-circuit paths are formed through the elements V2→D163→141→142→D162→U2, and through the elements V1→144→D142→U1→and V1→D143→141→U1. In this case, the primary winding of each of transformers T14 and T16 is substantially short-circuited. Accordingly, if the load 20 connected to the secondaries of transformers T14 and T16 generates a large counterelectromotive force, an accidental overcurrent temporarily flows from load 20 into unit inverters 14 and 16 until the breaker 18 is cut off. Such a temporary overcurrent is a serious problem when breaker 18 is not the high-speed type.

SUMMARY OF THE INVENTION

It is accordingly the object of the present invention to provide a multiple inverter which avoids an accidental or faulty overcurrent due to a shoot-through of switching elements of the inverter.

To achieve the above object, a multiple inverter according to the invention includes two or more unit inverters, an input shut-off circuit interposed between a DC power supply device and the DC input of each of the unit inverters, and control means coupled to the unit inverters for detecting an accidental or faulty overcurrent due mainly to a shoot-through so as to turn off the switching elements of the normal unit inverter. When the accidental overcurrent flows, all switching elements of the normal unit inverter are turned off and the circuit impedance of the input shut-off circuit becomes high or the current path of the DC input from one of the unit inverters to another unit inverter is cut off.

In other words a multiple inverter of the invention comprises:

an input shut-off circuit receiving a DC energy input and providing two or more DC outputs;

two or more unit inverters coupled to the input shut-off circuit for respectively converting the DC outputs into two or more AC outputs; and control means coupled to at least one of the unit inverters for detecting an accidental overcurrent due to, e.g., a shoot-through, so as to turn off the unit inverter, wherein a current path of the DC energy input is interrupted when the control means detects the accidental overcurrent.

The above multiple inverter may further include an output shut-off circuit provided in a current path of the AC outputs of the unit inverters. The output shut-off circuit cuts off the AC output current path when the control means detects the accidental overcurrent.

In the present invention the term "inverter" covers not only a device for converting DC to AC but also a device for converting AC to DC, such as a self-commutated rectifier.

BRIEF DESCRIPTION OF THE DRAWINGS

FIG. 16 shows a detailed circuit configuration of FIG. 6;

FIG. 17 is a concrete block configuration of a turn-off control device shown in FIG. 16.

DETAILED DESCRIPTION OF THE PREFERRED EMBODIMENTS

Before proceeding with the description of the embodiments of the invention, it will be expressly understood that like reference symbols are used to designate like portions throughout the drawings for simplicity of illustration and that the components designated by like reference symbols may easily be replaced with each other or one another with minor changes thereof by a person skilled in the art.

Figure 3:
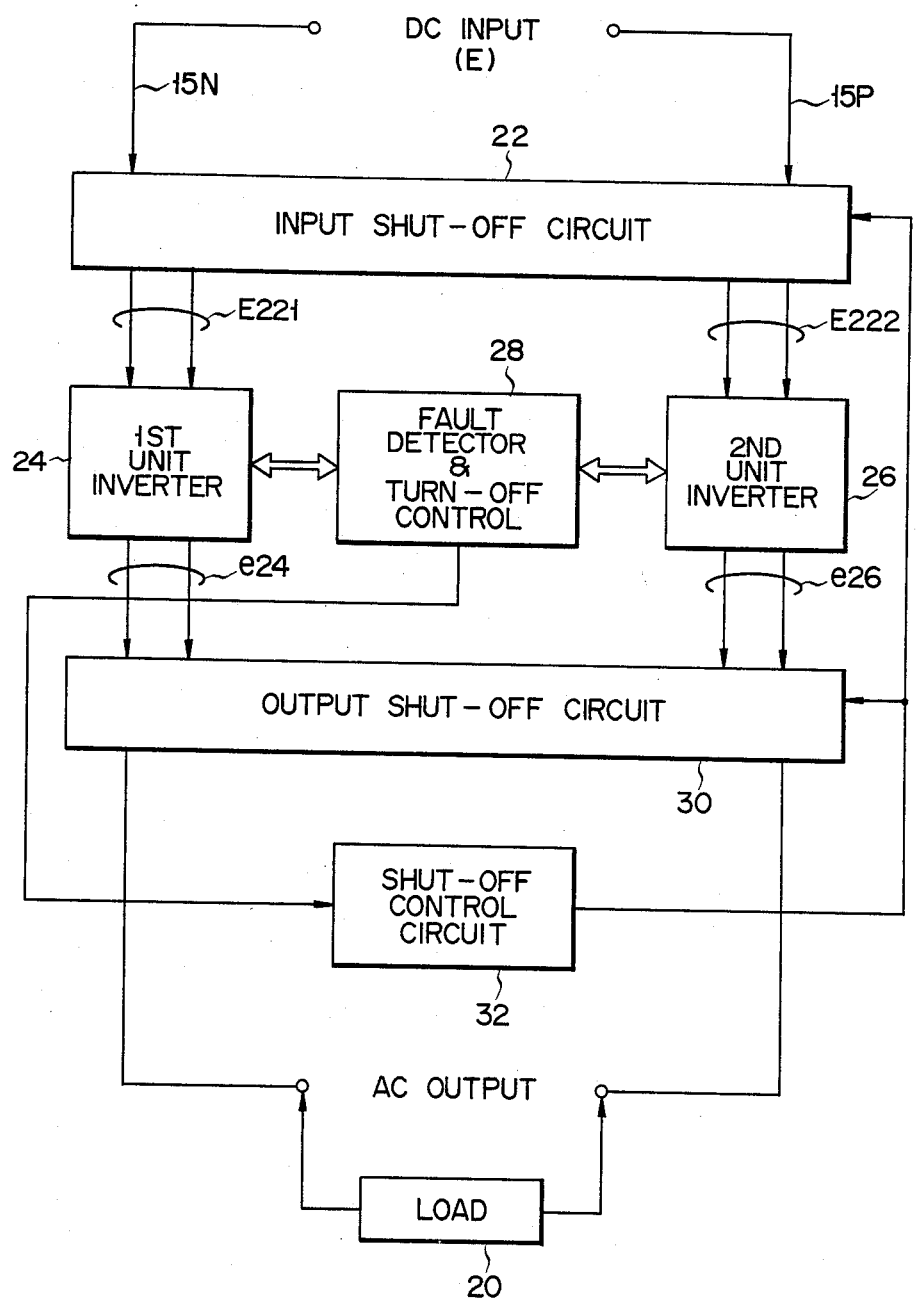
FIG. 3 shows a basic configuration of a multiple inverter of the present invention.

FIG. 3 shows a basic configuration of a multiple inverter of the invention. A DC energy input E is applied via DC power lines 15P and 15N to an input shut-off circuit 22. Circuit 22 provides two sets of DC outputs E221 and E222 and includes an element for interrupting a current path of the DC input E. DC outputs E221 and E222 are applied to a first unit inverter 24 and a second unit inverter 26, respectively. Each of the unit inverters 24 and 26 may be made of a GTO thyristor bridge. Unit inverter 24 transforms the applied DC output E221 into an AC output e24 and unit inverter 26 transforms the applied DC output E222 into an AC output e26. The on-off operation of the thyristors (switching elements) of each of the unit inverters 24 and 26 is under the control of a fault detector/turn-off control device 28. AC outputs e24 and e26 are composed in and pass through an output shut-off circuit 30. Circuit 30 provides a load 20 with the composed AC output as an AC output of the multiple inverter. Circuit 30 is provided with an element for cutting off the current path of the AC output.

The actuations of input and output shut-off circuits 22 and 30 may be controlled by a shut-off control circuit 32 which is coupled to the device 28. When device 28 detects an accidental overcurrent due to a shoot-through in unit inverter 24 and/or in unit inverter 26, the device 28 renders the inverters 24 and 26 inactive or cut off. At this time the circuit 32 senses the overcurrent detection in device 28 and shuts off the circuits 22 and 30.

Incidentally, when an element forming the shut-off circuit 22 and/or the shut-off circuit 30 is a self-operating type, such as a fuse, shut-off control by the circuit 32 may not be performed.

According to the configuration of FIG. 3, even if one or more thyristors of unit inverter 24 are accidentally broken down and the primary (DC input) of unit inverter 24 is short-circuited through the faulty thyristors, no large overcurrent flows. This is because, first, all normal thyristors of unit inverters 24 and 26 are instantly turned off by the actuation of device 28 and, subsequently, the current path of DC energy input E is cut off by the element of input shut-off circuit 22 and/or the current path of the AC output is cut off by the element of output shut-off circuit 30. Since the response speed of device 28 is quick enough, a high-speed breaker is not required for the element of shut-off circuit 22 or 30.

Here, when the input shut-off circuit 22 is provided, the output shut-off circuit 30 may be omitted. In this case, however, when the above-mentioned breakdown occurs in unit inverter 24, the full voltage of a counter-electromotive force of a load motor (load 20) is inadvertently applied only to the secondary of unit inverter 26. Accordingly, when output shut-off circuit 30 is omitted, the output transformer of unit inverters 24 and 26 should have a large capacity to avoid a magnetic saturation even when said full voltage of counter-electromotive force is applied to the output transformer.

Figure 11:
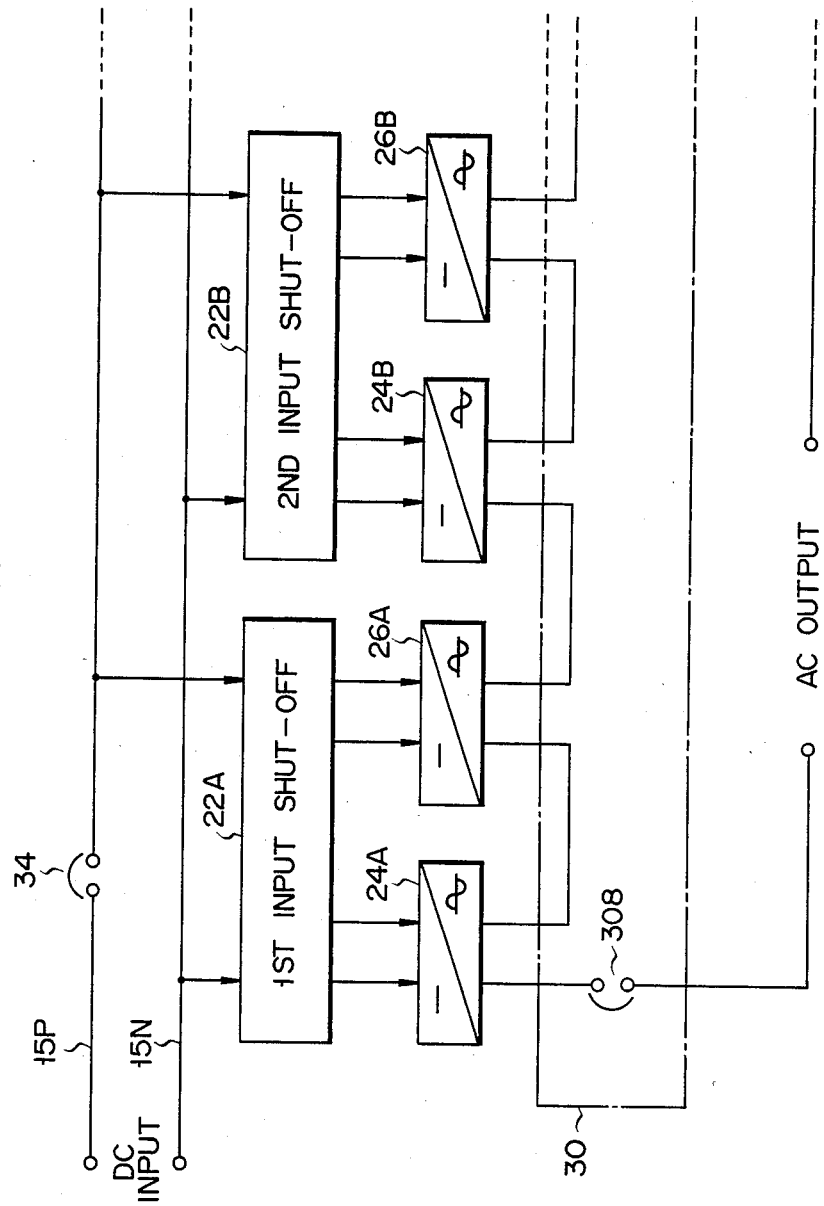
FIG. 11 shows a modification of FIG. 3 in which a plurality of sets of FIG. 3 or FIG. 12 configurations are cascade-connected.

When three or more unit inverters are used and the secondaries of these unit inverters are serially connected, the probability that only one unit inverter will accidentally be subjected to the full counter-electromotive force of load 20 decreases. Therefore, the use of many unit inverters whose secondaries are connected in series as shown in FIG. 11 is preferable for enhancing the reliability of the multiple inverter.

Figure 4:
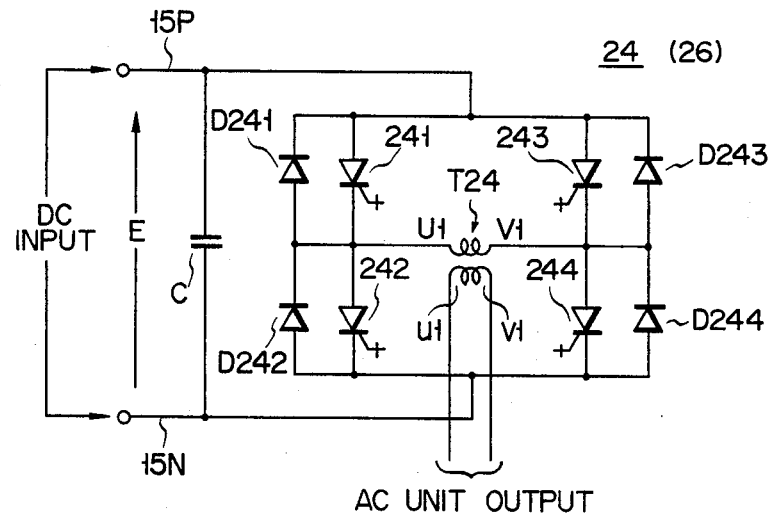
FIG. 4 shows a typical configuration of a single-phase unit inverter of FIGS. 3, 6, 7, 8 or 12.

FIG. 4 shows a typical configuration of a single-phase type first unit inverter 24. A positive DC line 15P is connected to the anode of each of the GTO thyristors 241 and 243. The cathode of thyristor 241 is connected to a terminal U1 of the primary winding of an output transformer T24. The cathode of thyristor 243 is connected to a terminal V1 of the primary winding of transformer T24. The terminals U1 and V1 are respectively connected to the anodes of GTO thyristors 242 and 244. The cathodes of thyristors 242 and 244 are connected to a negative DC line 15N. The DC lines 15P and 15N are coupled via a capacitor C. The capacitor C is used for stabilizing the switching operation of the thyristors. The cathode and anode of a diode D241 are respectively coupled to the anode and cathode of thyristor 241, i.e. the diode D241 is anti-parallel-connected to the thyristor 241. Similarly, diodes D242 to D244 are anti-parallel-connected to thyristors 242 to 244, respectively. The secondary winding (u1, v1) of the transformer T24 provides an AC output e24 of unit inverter 24. A second unit inverter 26 may have the same configuration as the configuration of first unit inverter 24.

Although not shown, a snubber circuit may be utilized for the unit inverter. Further, a reactor may be coupled in series to each of the GTO thyristors of the unit inverter as shown in Japanese patent application No. 51-49720.

Figure 5:
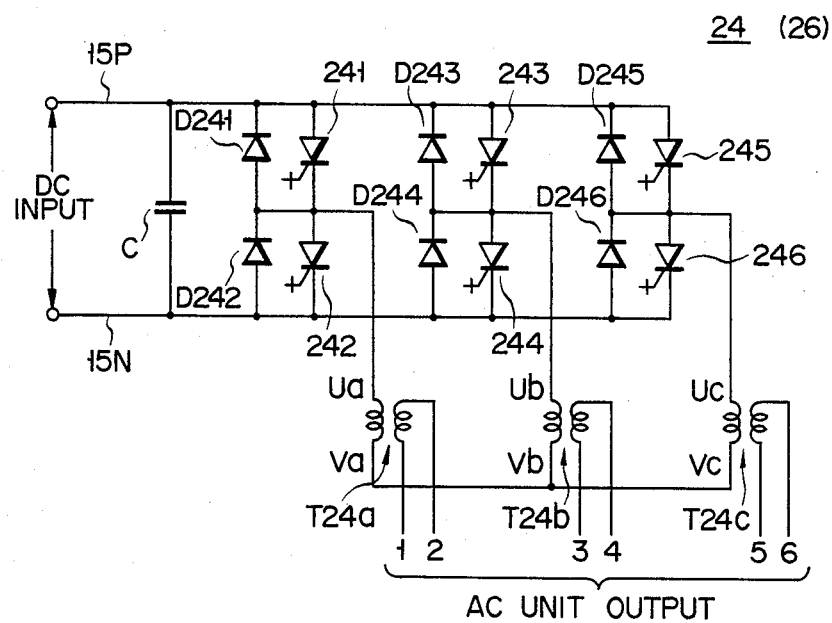
FIG. 5 shows a typical configuration of a three-phase unit inverter of FIG. 3.

FIG. 5 shows a typical configuration of a three-phase type first unit inverter 24. A positive DC line 15P is connected to the anodes of GTO thyristors 241, 243 and 245. The cathode of thyristor 241 is connected to a terminal Ua of the primary winding of a first output transformer T24a. The cathode of thyristor 243 is connected to a terminal Ub of the primary winding of a second output transformer T24b. The cathode of thyristor 245 is connected to a terminal Uc of the primary winding of a third output transformer T24c. The terminals Ua, Ub and Uc are connected to the anodes of GTO thyristors 242, 244 and 246, respectively. Terminals Va Vb and Vc of the primary windings of transformers T24a, T24b and T24c are connected to one another. The cathodes of thyristors 242, 244 and 246 are connected to a negative DC line 15N. The DC lines 15P and 15N are coupled via a capacitor C. Diodes D241 to D246 are anti-parallel-connected to thyristors 241 to 246, respectively. The secondary windings 1 to 6 of the transformers T24a, T24b and T24c provide three-phase AC outputs of the unit inverter 24. A second three-phase unit inverter 26 may have the same configuration as the first three-phase unit inverter 24.

Each thyristor is kept ON during the half cycle of the output frequency and the turn-on sequence for the thyristors 241 to 246 of FIG. 5 is, for instance, 241→246→243→242→245→244. The turn-on phase angle for each of the above thyristors is 60°. Such a turn-on control may be performed by a gate control system disclosed in U.S. Pat. No. 4,301,500 (issued on Nov. 17, 1981; Seki et al.).

When a PWM (pulse width modulation) technique is utilized, a voltage-variable three-phase AC output can be obtained. Such a PWM inverter is briefly discussed in:

ELECTRONICS ENGINEER'S HANDBOOK (2nd ed.);
Donald G. Fink (Ed.)
McGraw Hill, New York, 1982,
PP. 15-40 to 15-43 or
PRINCIPLES OF INVERTER CIRCUITS;
Bedford, B.D. and Hoft, R.G.
John Wiley and Sons, Inc., 1964

Figure 6:
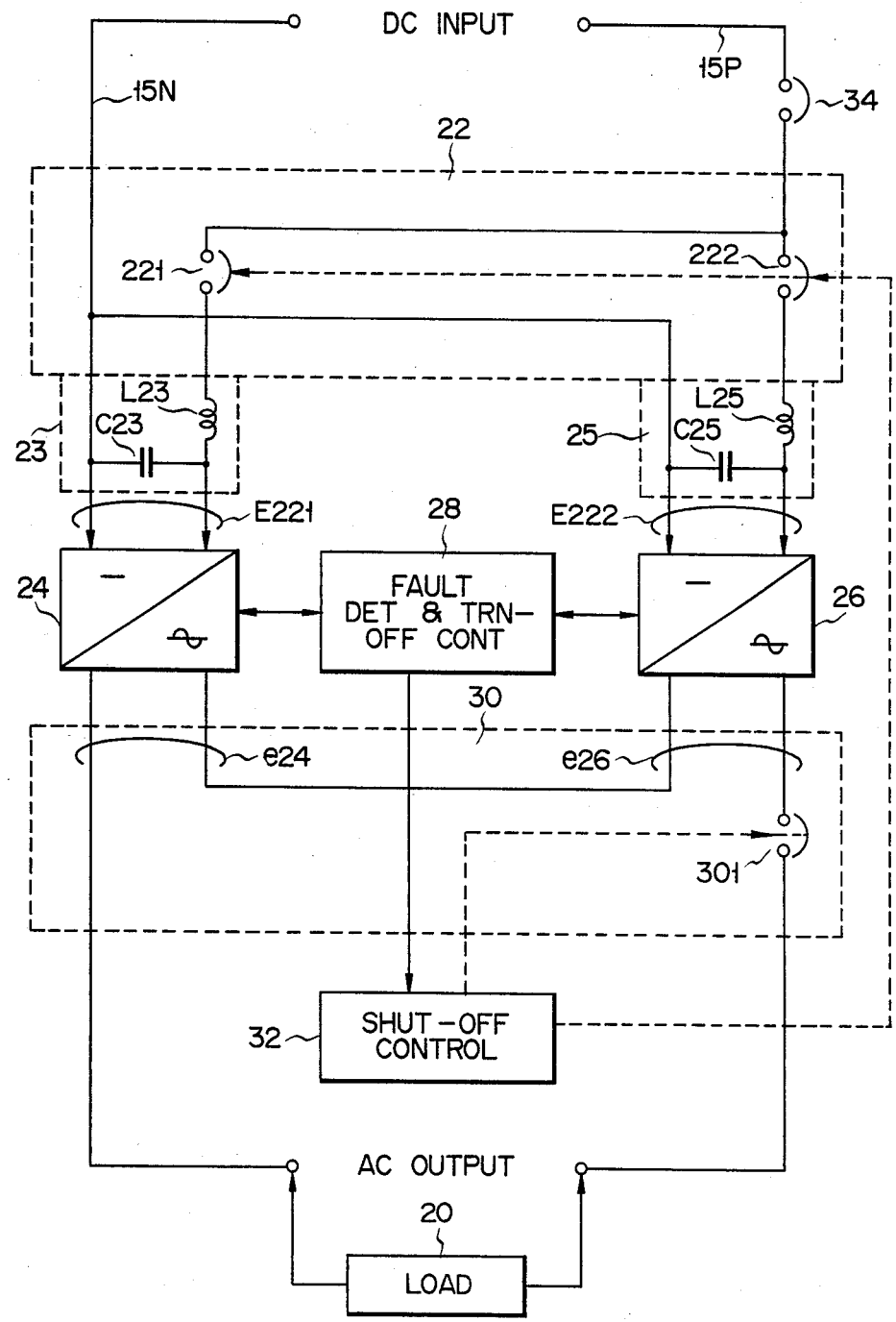
FIG. 6 shows a reduced configuration of FIG. 3 in which DC inputs of the unit inverters are parallel-connected and AC outputs thereof are serially connected.

FIG. 6 shows a reduced configuration of FIG. 3. A positive DC line 15P is connected via a conventional current breaker 34 to one terminal of each of the input breakers 221 and 222. The other terminal of breaker 221 is connected to a negative DC line 15N via a series circuit of a reactor (inductor) L23 and a capacitor C23. The elements L23 and C23 form a ripple filter 23. The other terminal of breaker 222 is connected to the negative DC line 15N via a series circuit of a reactor L25 and a capacitor C25. The elements L25 and C25 form a ripple filter 25. Both ends of capacitor C23 are connected to the DC input terminals of a first unit inverter 24, and both ends of capacitor C25 are connected to the DC input terminals of a second unit inverter 26.

Reactor L23 is used for temporarily preventing the DC lines 15P and 15N from short-circuiting when a shoot-through occurs in the first unit inverter 24 and the breakers 221 and 34 are not yet cut off. Similarly, reactor L25 is used for temporarily preventing the DC lines 15P and 15N from short-circuiting when a shoot-through occurs in the second unit inverter 26 and the breakers 222 and 34 are not yet cut off.

When breakers 221, 222 and 34 are of the mechanical type, several tens of milliseconds are generally required for the actuation of a complete cut off. Accordingly, the inductance of each of the reactors L23 and L25 should be one that prevents the lines 15P and 15N from short-circuiting during the actuation time (several tens of milliseconds) of the breakers.

The AC output of unit inverter 24 is connected in series to the AC output of unit inverter 26, and the series-connected AC outputs are applied to a load 20 (e.g. a synchronous motor). An output breaker 301 is provided in the series current path of the AC outputs of unit inverters 24 and 26.

A shoot-through in unit inverter 24 or 26 is detected by a fault detector/turn-off control device 28. Device 28 turns off all normal thyristors of unit inverter 24 or 26 when a shoot-through is detected. This shoot-through causes a shut-off circuit 32 to operate, and the breakers 221, 222 and 34 are cut off. The cut off actuation of these breakers may be performed by, e.g., a trip mechanism of a so-called MCCB (circuit breaker). At this time, a current path from the load 20 to the unit inverter 24 is interrupted by the unit inverter 26, all of whose thyristors are forcibly turned off by the device 28. Accordingly, even if breaker 301 is not yet cut off, no large current flows in the AC output line of unit inverters 24 and 26.

Incidentally, where there are few ripples involved in the DC energy input and the actuation speed of each of the breakers 221 and 222 is high enough, the filters 23 and 25 may be omitted. When the reliability of breakers 221 and 222 is satisfactory, the breaker 34 may also be omitted.

An input-parallel output-series connection of unit inverters as shown in FIG. 6 is adapted for an electric energy conversion of a low-voltage large-current DC input to a high-voltage low-current AC output.

Figure 7:
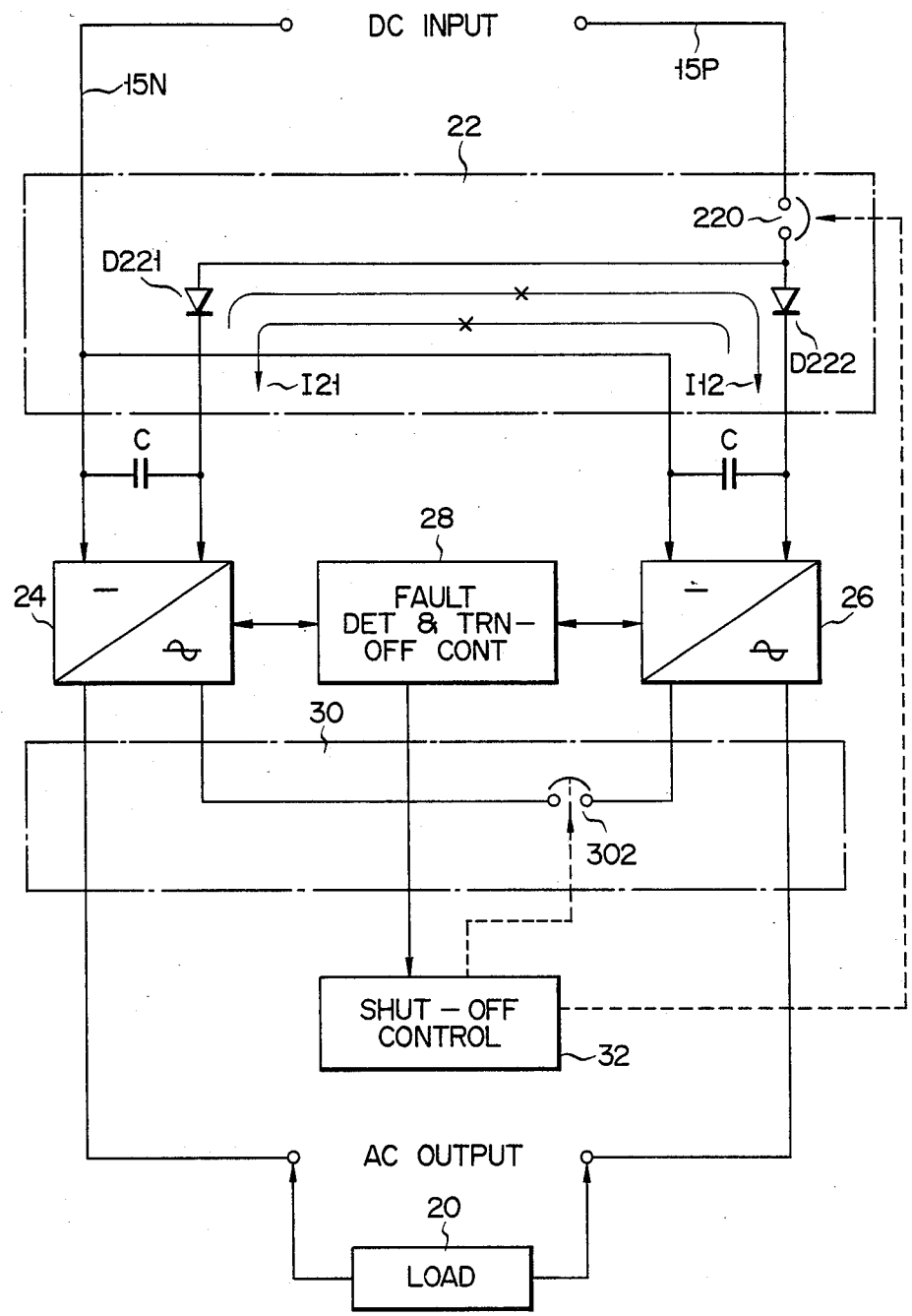
FIG. 7 shows a modification of FIG. 6.

FIG. 7 shows a modification of FIG. 6. A DC line 15P is coupled via a breaker 220 and a diode D221 to a first unit inverter 24 and, via the breaker 220 and a diode D222, to a second unit inverter 26. Each of the diodes D221 and D222 functions as a unidirectional current conductor. That is, a current I12 from unit inverter 24 to unit inverter 26 is blocked by the diode D221, and a current I21 from unit inverter 26 to unit inverter 24 is blocked by the diode D222. The AC output of unit inverter 24 is connected in series to the AC output of unit inverter 26 via a breaker 302. The actuation of each of breakers 220 and 302 is controlled by a shut-off circuit 32.

Assume here that a shoot-through occurs in the unit inverter 24 and the DC input of unit inverter 24 is short-circuited via broken thyristors of unit inverter 24, that all normal thyristors of unit inverters 24 and 26 are cut off by the actuation of the device 28, that the breakers 220 and 302 are not yet cut off, and that the load 20 includes a generator element (electromotive force source).

When a specific event, such as in the above hypothesis occurs, diodes D221 and D222 block the currents I12 and I21, and thus the primary circuit of normal unit inverter 26 is not short-circuited via the primary circuit of the broken unit inverter 24, or the secondary of unit inverter 26 maintains a high impedance. Therefore, even if a large voltage of counter-electromotive force of the load 20 is applied to the secondaries of unit inverters 24 and 26, no overcurrent flows in the AC output line of the multiple inverter, because the secondary of unit inverter 26 maintains a high impedance.

The configuration of FIG. 7 is particularly preferable when a DC power source for the multiple inverter is a battery such as a fuel cell.

Figure 8:
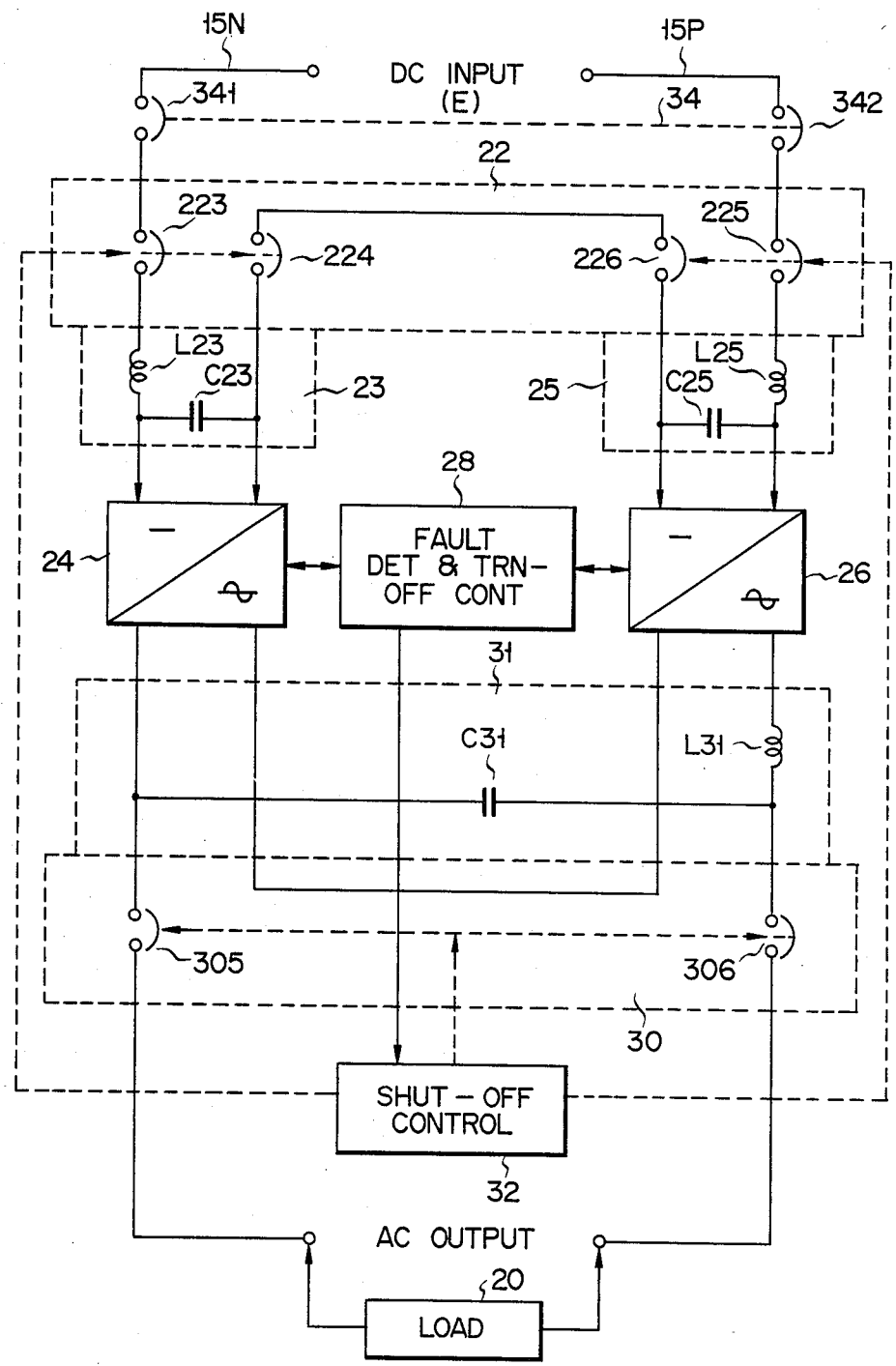
FIG. 8 shows another reduced configuration of FIG. 3 in which DC inputs of the unit inverters are serially connected and AC outputs thereof are also serially connected.

FIG. 8 shows another reduced configuration of FIG. 3. A negative DC line 15N is connected to one primary DC input of a first unit inverter 24 via breakers 341 and 223 and a reactor L23. A positive DC line 15P is connected to one primary DC input of a second unit inverter 26 via breakers 342 and 225 and a reactor L25. The other primary DC input of unit inverter 24 is serially connected via breakers 224 and 226 to the other primary DC input of unit inverter 26. One secondary AC output of unit inverter 24 is connected in series to one secondary AC output of unit inverter 26. The other secondary AC output of unit inverter 26 is connected via a reactor L31 and a capacitor C31 to the other secondary AC output of unit inverter 24. The elements L31 and C31 form a low-pass filter 31 for reducing or improving a distortion factor of the AC output sine voltage. The output circuit lines of filter 31 are connected to AC output terminals via breakers 305 and 306. The actuations of breakers 341-342, 223-224, 225-226, and 305-306 are respectively ganged to each other, and each ganged pair of breakers 223-224, 225-226 and 305-306 is controlled by a shut-off control circuit 32.

The circuit connection of the multiple inverter of FIG. 8 is a type of input-serial and output-serial. Such a multiple inverter is adapted to an electric energy conversion of a high-voltage low-current DC input to a high-voltage low-current AC output.

The series connection of the filters 23 and 25 has a specific function. That is, when the DC input of unit inverter 24 is short-circuited due to a shoot-through, these filters 23 and 25 temporarily prevent the DC input of unit inverter 26 from being subjected to the full voltage of DC input E until any of the breakers 223 to 226 are cut off.

Figure 9:
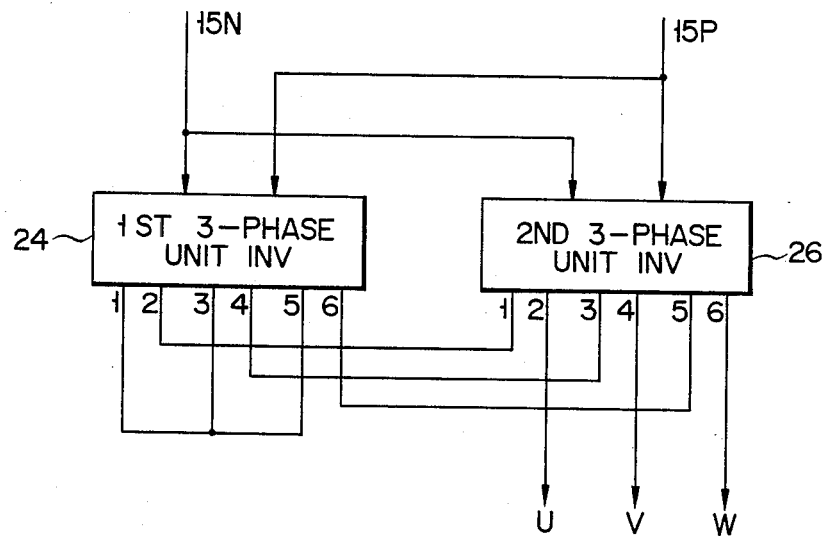
FIG. 9 shows a connection of three-phase unit inverters wherein AC outputs of the unit inverters are Y-coupled.
Figure 10:
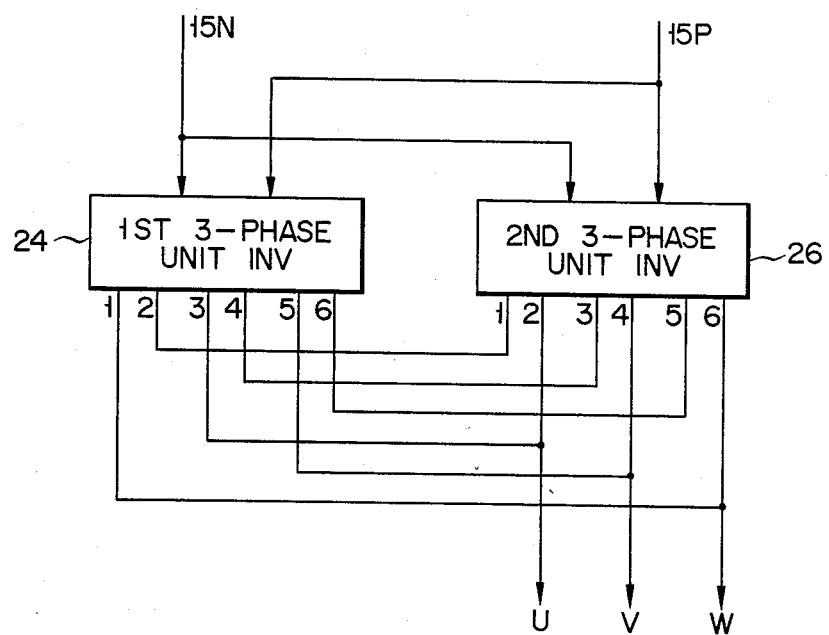
FIG. 10 shows a connection of three-phase unit inverters wherein AC outputs of the unit inverters are Δ-coupled.

FIGS. 9 and 10 show connections of two types of three-phase unit inverters. Each of these unit inverters may have the configuration of FIG. 5. In FIG. 9, AC output terminals 1, 3 and 5 of three internal transformers of a first unit inverter 24 are connected to one another. AC output terminals 2, 4 and 6 of the transformers of unit inverter 24 are connected respectively to AC output terminals 1, 3 and 5 of three internal transformers of a second unit inverter 26. AC output terminals 2, 4 and 6 of the transformers of unit inverter 26 provide a star-coupled three-phase AC output. In FIG. 10, AC output terminals 1, 2, 3, 4, 5 and 6 of a first unit inverter 24 are coupled respectively to AC output terminals 6, 1, 2, 3, 4 and 5 of a second unit inverter 26, and terminals 2, 4 and 6 of unit inverter 26 provide a delta-coupled three-phase AC output.

FIG. 11 shows a configuration of a cascade-connected multiple inverter. The combination of a first input shut-off circuit 22A and unit inverters 24A and 26A may be the same as the combination of a second input shut-off circuit 22B and unit inverters 24B and 26B, and each of these combinations may have the same configuration as FIG. 6, 7 or 8. In such a cascade-connected multiple inverter, the DC input of first input shut-off circuit 22A, that of second input shut-off circuit 22B, etc., are parallel-connected, and the AC output of unit inverters 24A, 26A, 24B, 26B, etc., are connected in series. Some outputs of unit inverters may be connected in parallel (i.e., a series/parallel connection).

The series-connected AC outputs of the unit inverters are coupled via an output breaker 308 to AC output terminals. The parallel-connected DC inputs of the input shut-off circuits are coupled via an input breaker 34 to DC input terminals.

The configuration of FIG. 11 is particularly suitable where the DC input is a low-voltage and very large-current type and the AC output is a very high-voltage and small-current type.

Figure 12:
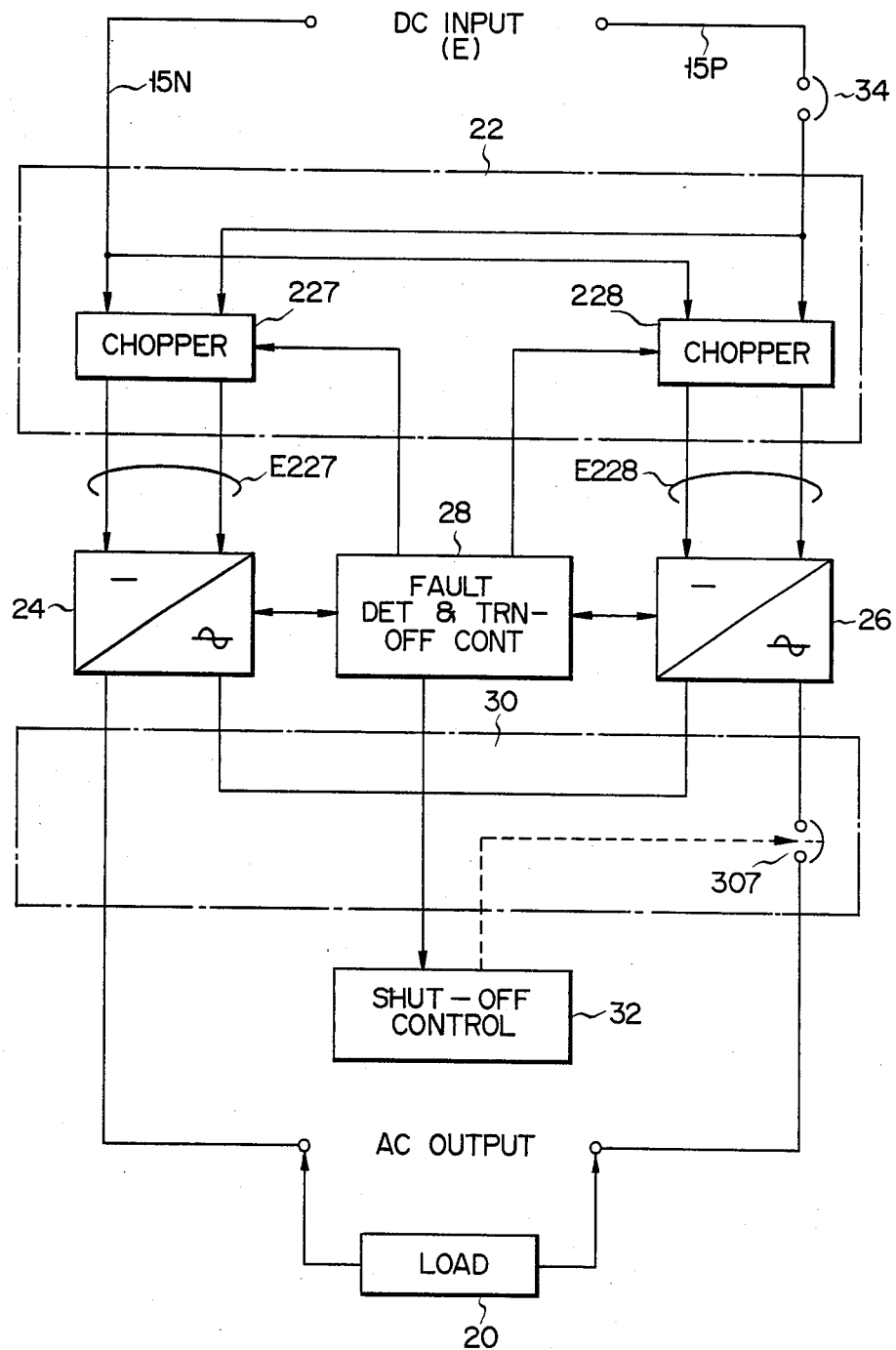
FIG. 12 shows another modification of FIG. 6.

FIG. 12 shows another modification of FIG. 6. DC lines 15P and 15N are coupled via a breaker 34 to the inputs of choppers 227 and 228. Chopper 227 chops the inputted DC energy E and supplies a first unit inverter 24 with a voltage-controlled DC output E227. Chopper 228 chops the inputted DC energy E and supplies a second unit inverter 26 with a voltage-controlled DC output E228. The switching control for each of the choppers 227 and 228 is performed by a fault detector/turn-off control device 28. Thus, each duty cycle of the switching of the choppers 227 and 228 is changed so as to regulate the voltage of each of the DC outputs E227 and E228.

Figure 13:
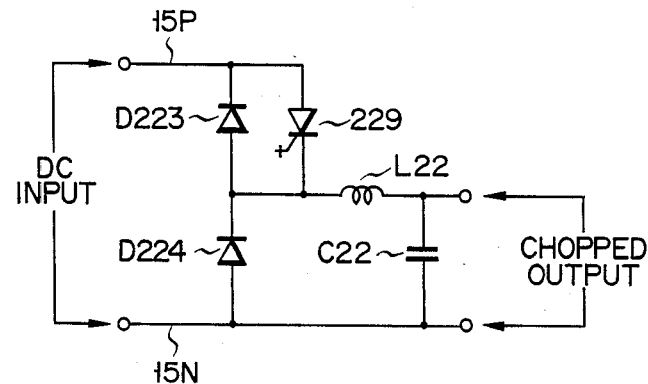
FIG. 13 shows details of an example of a chopper circuit of FIG. 12.

Each of the choppers 227 and 228 may have a configuration as shown in FIG. 13. The positive DC line 15P is connected to the cathode of a diode D223. The anode of diode D223 is connected via the cathodeanode path of a diode D224. A GTO thyristor 229 used as the choppering switch element is anti-parallel-connected to diode D223. The cathode of thyristor 229 is connected via the series circuit of a reactor L22 and a capacitor C22 to the DC line 15N. The DC output E227 (or E228) of chopper 227 (or 228) is obtained from the both ends of capacitor C22. The gate of thyristor 229 may be controlled by a conventional chopper control circuit.

The use of choppers 227 and 228 for controlling the AC output voltages of unit inverters 24 and 26 is advantageous because the rate of harmonics involved in the AC output is substantially constant and thus a simple means, e.g., LC filter 31 as shown in FIG. 8, may be practical for reducing the harmonics.

Where the thyristor 229 of FIG. 13 is turn-off controlled by device 28 of FIG. 12, each of the choppers 227 and 228 can function as a breaker when the device 28 detects a shoot-through in the unit inverter 24 or 26.

Figure 14:
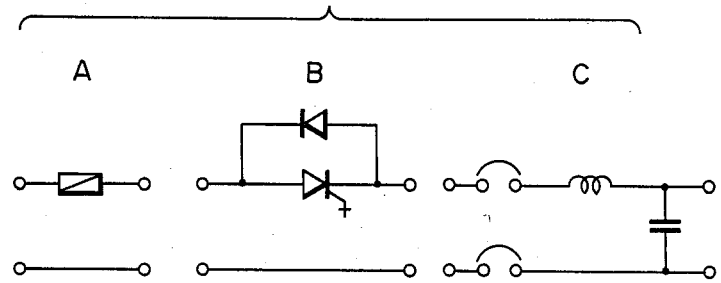
FIG. 14 shows examples of current breakers.

FIG. 14 shows examples of conventional breakers. FIG. 14A shows a fuse, FIG. 14B shows a GTO thyristor breaker and FIG. 14C shows a circuit breaker whose actuation time for cutting off is, e.g., about 20 ms. When a shoot-through occurs, a reactor of LC filter of FIG. 14C temporarily retards a large current flow until the breaker completes the cut off actuation.

Figure 15:
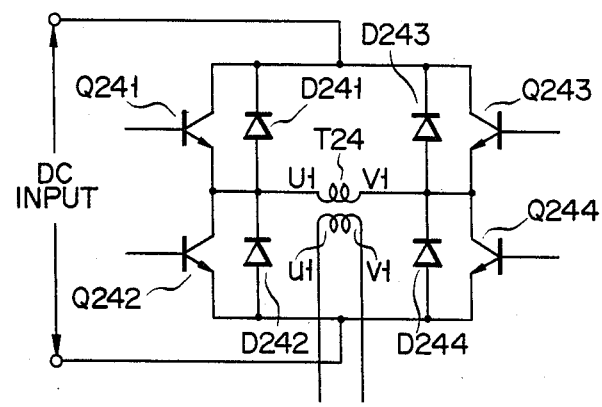
FIG. 15 shows a modification of FIGS. 4 or 16.

FIG. 15 shows a modification of FIG. 4. That is, four GTO thyristors 241 to 244 of FIG. 4 are respectively substituted for four bipolar transistors Q241 to Q244. The configuration of FIG. 15 (single-phase type) may be applied to the configuration of FIG. 5 (three-phase type) with necessary modifications.

FIG. 16 shows a detailed circuit configuration of FIG. 6. A positive DC line 15P is connected via breakers 34 and 221 and an LC filter 23 to the DC input of a first unit inverter 24. DC line 15P is also connected via the breaker 34, a breaker 22 and an LC filter 25 to a second unit inverter 26. The AC output of unit inverter 24 is connected in series to the AC output of unit inverter 26. The series-connected AC output of unit inverters 24 and 26 is connected to AC output terminals via a breaker 301.

When a shoot-through occurs in the unit inverter 24, an accidental or faulty overcurrent IA1 transiently flows from a capacitor C23 into the DC input circuit of unit inverter 24. This transient overcurrent IA1 is sensed by a current probe (or sensor transformer) S281. Probe S281 generates a pulse P281 when the current IA1 flows. Pulse P281 is applied to the gate of a thyristor TH281 via a diode D281, a Zener diode ZD281 and an attenuator being formed of resistors R283 and R285. When the amplitude of pulse P281 exceeds a given threshold level, the thyristor TH281 turns on. Here, the given threshold level depends on the characteristics or values of the elements D281, ZD281, R283, R285 and TH281.

When a shoot-through occurs in the unit inverter 26, an accidental or faulty overcurrent IA2 transiently flows from a capacitor C25 into the DC input circuit of unit inverter 26. This transient overcurrent IA2 is sensed by a current probe (or sensor transformer) S282. Probe S282 generates a pulse P282 when the current IA2 flows. Pulse P282 is applied to the gate of a thyristor TH282 via a diode D282, a Zener diode ZD282 and an attenuator being formed of resistors R284 and R286. When the amplitude of pulse P282 exceeds a second given threshold level, the thyristor TH282 turns on. Here, the second given threshold level depends on the characteristics or values of the elements D282, ZD282, R284, R286 and TH282.

When the thyristor TH281 turns on, an exciting current IE flows from a DC power source 320 into an exciting field coil 321 of each of the breakers 221, 222 and 301. At the same time a discharge current of a capacitor C281 flows via the turned-on thyristor TH281 into the primary of a pulse transformer T281. Then a trigger pulse is induced in the secondary of transformer T281. The induced trigger pulse is applied via a diode D283 as a negative trigger pulse P283 to a turn-off control device 280. Similarly, when an accidental overcurrent IA2 transiently flows from capacitor C25 into the DC input circuit of unit inverter 26, the field coil 321 is excited and a negative trigger pulse P284 is obtained via a diode D284 from the induced pulse of the secondary of a pulse transformer T282.

The thyristor bridge of unit inverter 24 is under the control of gate control signals GS1, and the thyristor bridge of unit inverter 26 is under the control of gate control signals GS2. Gate control signals GS1 and GS2 are obtained from a turn-off control device 280. The device 280 governs the on-off sequence of each of unit inverters 24 and 26. When the trigger pulse P283 is applied, the device 280 turns off all the normal thyristors of unit inverter 26. When the trigger pulse P284 is applied, the device 280 turns off all the normal thyristors of unit inverter 24. Then, the excited field coil 321 cuts off the breakers 221, 222 and 301 with a slight delay (generally about 10 ms).

Figure 1:
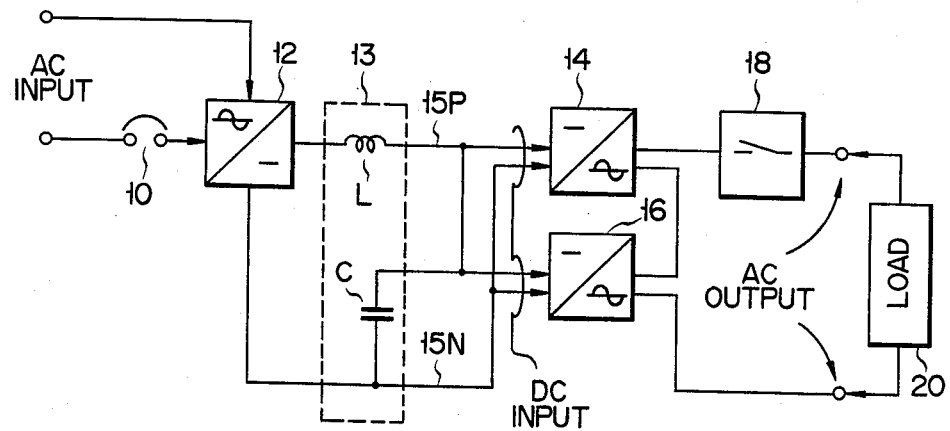
FIG. 1 shows a typical configuration of a prior art multiple inverter.
Figure 2:
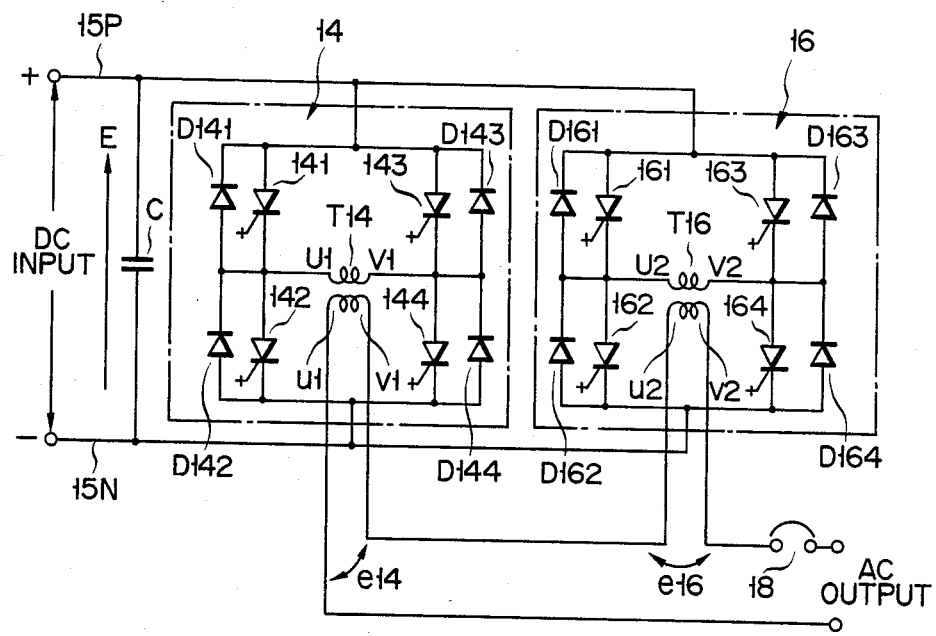
FIG. 2 shows details of unit inverters of a prior art multiple inverter.

FIG. 17 shows a concrete configuration of the turn-off control device 280. The negative trigger pulse P283 is inputted to an OR gate array and gate block circuits. These gate array and gate block circuits generate the gate control signals GS2 according to the operation of associated circuits. Although not shown, the device 280 further includes another set of FIG. 17 configuration which responds to the pulse P284 and generates the signals GS1. The configuration of FIG. 17 is identical with that of FIG. 2 of U.S. Pat. No. 4,301,500. All disclosures of this U.S. patent are now combined herewith.

Incidentally, respective unit inverters of multiple inverters may have different phase angles for improving a waveform of the AC output. Where one of the unit inverters is cut off due to a shoot-through, other unit inverters are still operating and a load of the multiple inverter generates a counter-electromotive force, then the phase of the AC output voltage of the multiple inverter varies, and a phase difference between the AC output and the counter-electromotive force accidentally or faultily appears. When such an accidental phase difference is to be avoided, the phase of the AC output of the multiple inverter may be automatically corrected by a conventional technique using the timing of trigger pulse P283 or P284 in FIG. 16.

FIGS. 18 to 23 respectively show associated circuits of the multiple inverter.

Figure 18:
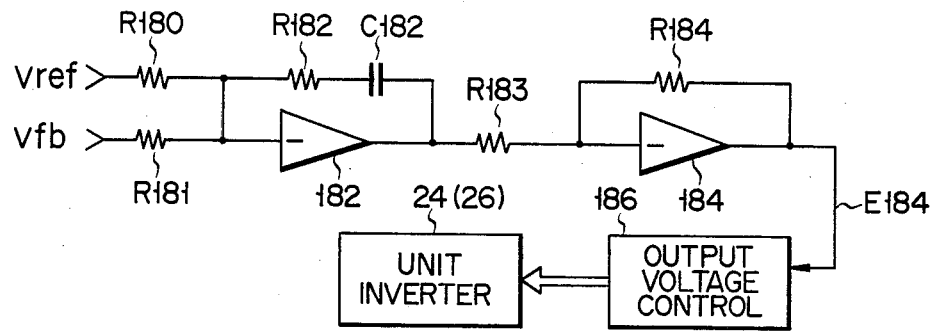
FIGS. 18 to 23 respectively show associated circuitries of the multiple inverter.

FIG. 18 is a basic circuit of a voltage regulator system. A positive reference voltage Vref and a negative feedback voltage Vfb are applied via resistors R180 and R181, respectively, to the inverted input of an operational amplifier 182. The inverted input of amplifier 182 is connected via a resistor R182 and a capacitor C182 to the output thereof. The amplifier 182 forms a proportion-integration circuit.

The output of amplifier 182 is connected via a resistor R183 to the inverted input of an operational amplifier 184. The inverted input of amplifier 184 is connected via a resistor R184 to the output thereof. The amplifier 184 forms a proportion circuit.

An output signal E184 of amplifier 184 is applied to an output voltage control device 186. The device 186 controls the AC output voltage of unit inverter 24 and/or the AC output voltage of unit inverter 26. A part of the AC output voltage of unit inverter 24 (or of unit inverters 24 and 26) is detected and used as said feedback voltage Vfb. Thus, the combination of FIGS. 16 and 18 permits regulation of an AC output voltage to a prescribed value as well as cutting off the input and output breakers 221 and 222 and 301 when said accidental or faulty overcurrent flows. Where a load of the multiple inverter generates a counter-electromotive force, the configuration of FIG. 18 also senses an output voltage variation due to such a counter-electromotive force, and it regulates the AC output voltage.

When a configuration of U.S. Pat. No. 4,166,247 is utilized for the device 186, the output of amplifier 184 is coupled to the input of an A/D converter shown in FIG. 4 of this U.S. patent.

Incidentally, configurations disclosed in a conference paper delivered to the IEE entitled "PEPSA (Power Electronics Power Semiconductors and their Applications)", United Kingdom, 1977, pp. 142 to 145, may also be utilized for the device 186.

Figure 19:
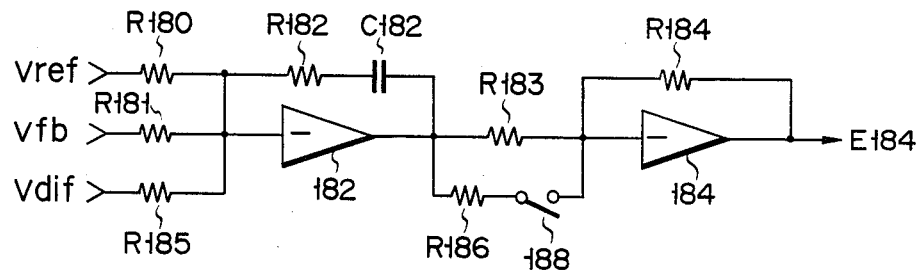

FIG. 19 is used in a case where one multiple inverter is coupled to the AC output of another multiple inverter and these multiple inverters have the same configurations. Such a case is often seen in a constant voltage & constant frequency power supply apparatus which is free from interruption of electric service.

The AC output voltage of each multiple inverter is so controlled that all AC output voltages coincide with one another for a parallel operation. A reference voltage Vref has a fixed DC potential. A feedback voltage Vfb has a DC potential corresponding to the AC output voltage of one of the multiple inverters. A feedback voltage Vdif has a DC potential corresponding to a potential difference between the AC output voltages of respective multiple inverters. The voltage Vdif is equivalent to the signal $\Delta V_{DET}$ indicated in FIG. 3 of the aforementioned paper. The voltages Vref, Vfb and Vdif are applied to the inverted input of an amplifier 182 via resistors R180, R181 and R185, respectively.

The circuit connection of FIG. 19 is the same as that of FIG. 18 except that the voltage Vdif is fed back to the amplifier 182 and a series circuit of a resistor R186 and a switch 188 is coupled in parallel to the resistor R183. The resistance value of each of the resistors R180, R181 and R185 determines the gain of the proportion-integration amplifier 182. The resistance value of each of the resistors R183 and R186 determines the gain of the proportion amplifier 184. Thus, when switch 188 is turned on, the gain of amplifier 184 is increased from "−R184/R183" to "−R184/R183 ∥ R186" (here R183 ∥ R186 denotes the parallel resistance value of resistors R183 and R186).

Suppose that two multiple inverters are operated in parallel, that each multiple inverter has a configuration as shown in FIG. 16, and that the switch 188 of one multiple inverter is coupled to the exciting field coil 321 (FIG. 16) of the other multiple inverter. When a shoot-through occurs in one multiple inverter and subsequently this multiple inverter is shut-off, the AC output voltage of the parallel multiple inverters tends to slightly decrease. At this time, however, the field coil 321 turns on the switch 188, and the gain of proportion amplifier 184 of the other multiple inverter increases. Then the AC output of the other multiple inverter increases, resulting in canceling the tendency of a slight decrease of AC output of the parallel-operating multiple inverters. This canceling actuation is quickly performed when the fault detector 28 of FIG. 16 detects the overcurrent IA1 and/or IA2, and is one feature of a multiple inverter of the present invention.

Figure 20:
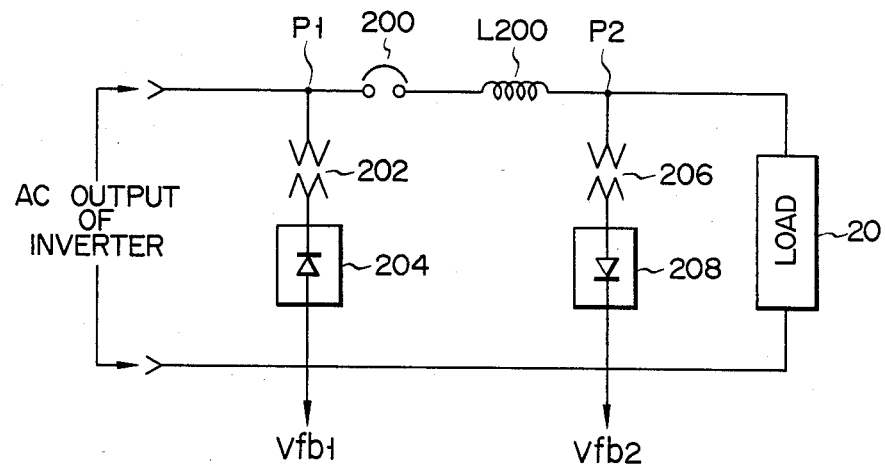

FIG. 20 shows a case where a reactor is inserted in a power line of the AC output of a multiple inverter. Thus, the AC output of the multiple inverter of FIG. 16 is applied via a breaker 200 and a reactor L200 to a load 20 which may contain a generator element or a reactance element. The AC voltage potential at an AC input point P1 is voltage-transformed by a transformer 202 and rectified by a rectifier 204. The rectifier 204 outputs a first feedback voltage −Vfb1 which corresponds to the voltage potential at the point P1. The AC voltage potential at an AC output point P2 is voltage-transformed by a transformer 206 and rectified by a rectifier 208. The rectifier 208 outputs a second feedback voltage +Vfb2 which corresponds to the voltage potential at the point P2.

Figure 21:
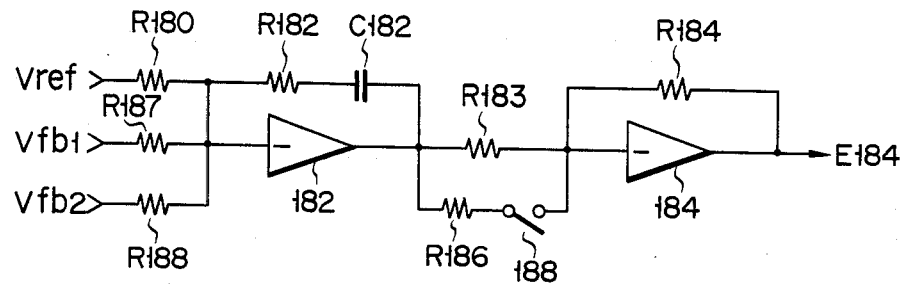

The circuit of FIG. 21 is used in combination with the configuration of FIG. 20. The first and second feedback voltages Vfb1 and Vfb2 are applied to the inverted input of an amplifier 182 via resistors R187 and R188, respectively. Applied also to the inverted input of amplifier 182 is a reference voltage Vref which may be used for adjusting the reactive power.

When a shoot-through occurs in one of the multiple inverters and the switch 188 of another multiple inverter is turned on, the gain of the proportion amplifier 184 of another multiple inverter increases and the AC output voltage applied to the load 20 is controlled according to the voltages Vfb1 and Vfb2.

Figure 22:
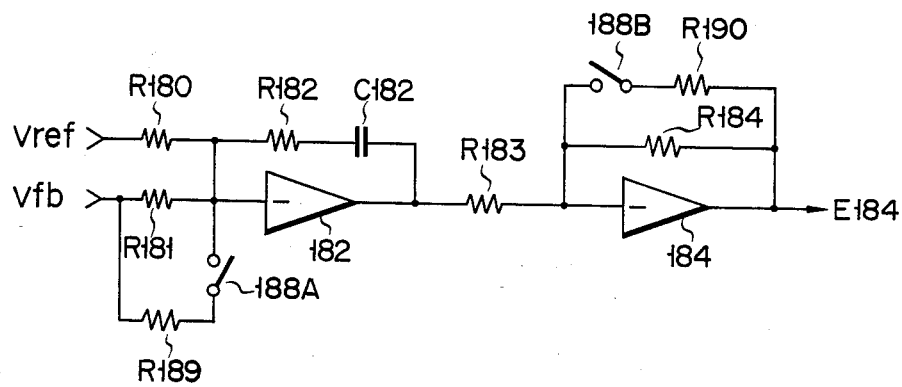

The circuit configuration of FIG. 22 may be used when the load of a multiple inverter includes an AC motor. The configuration of FIG. 22 is the same as that of FIG. 18 except that a series circuit of a switch 188A and a resistor R189 is connected in parallel to the resistor R181, and that a series circuit of a switch 188B and a resistor R190 is connected in parallel to the resistor R184. According to the circuitry of FIG. 22 there is no need to fix the AC output voltage of a multiple inverter when a shoot-through occurs. Thus, if the AC output voltage of a multiple inverter traces out the counter-electromotive force of load motor 20, the voltage potential difference between the AC output and the counter-electromotive force becomes small, resulting in less load current flow at the time when the shoot-through occurs. For such a voltage tracing, switches 188A and 188B are turned on. The turn-on of switch 188A lowers the potential of signal E184 and the turn-on of switch 188B decreases the gain of proportion amplifier 184. Then, the potential of the AC output of the multiple inverter decreases so that the AC output traces the counter-electromotive force of the load motor.

Generally speaking, a period corresponding to several cycles of AC output alternations is necessary to carry out a complete shut-off of the power supply of the multiple inverter. Accordingly, a temporary overcurrent during the period of said several cycles should be as small as possible. This is the reason why the above-mentioned voltage tracing control is performed.

Incidentally, the disclosure of Japanese patent application Publication No. 50-7735 may be utilized for the above voltage tracing control. This Publication teaches how to utilize the inversion of a current vibration appearing when a shoot-through occurs.

Figure 23:
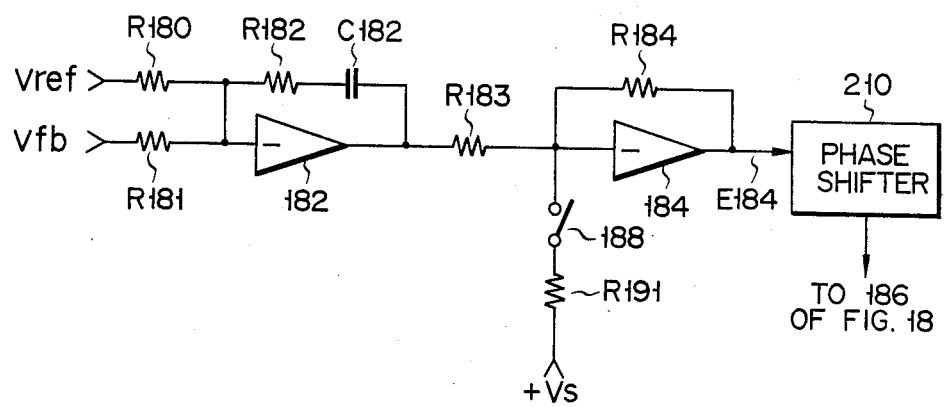
Figure 24:
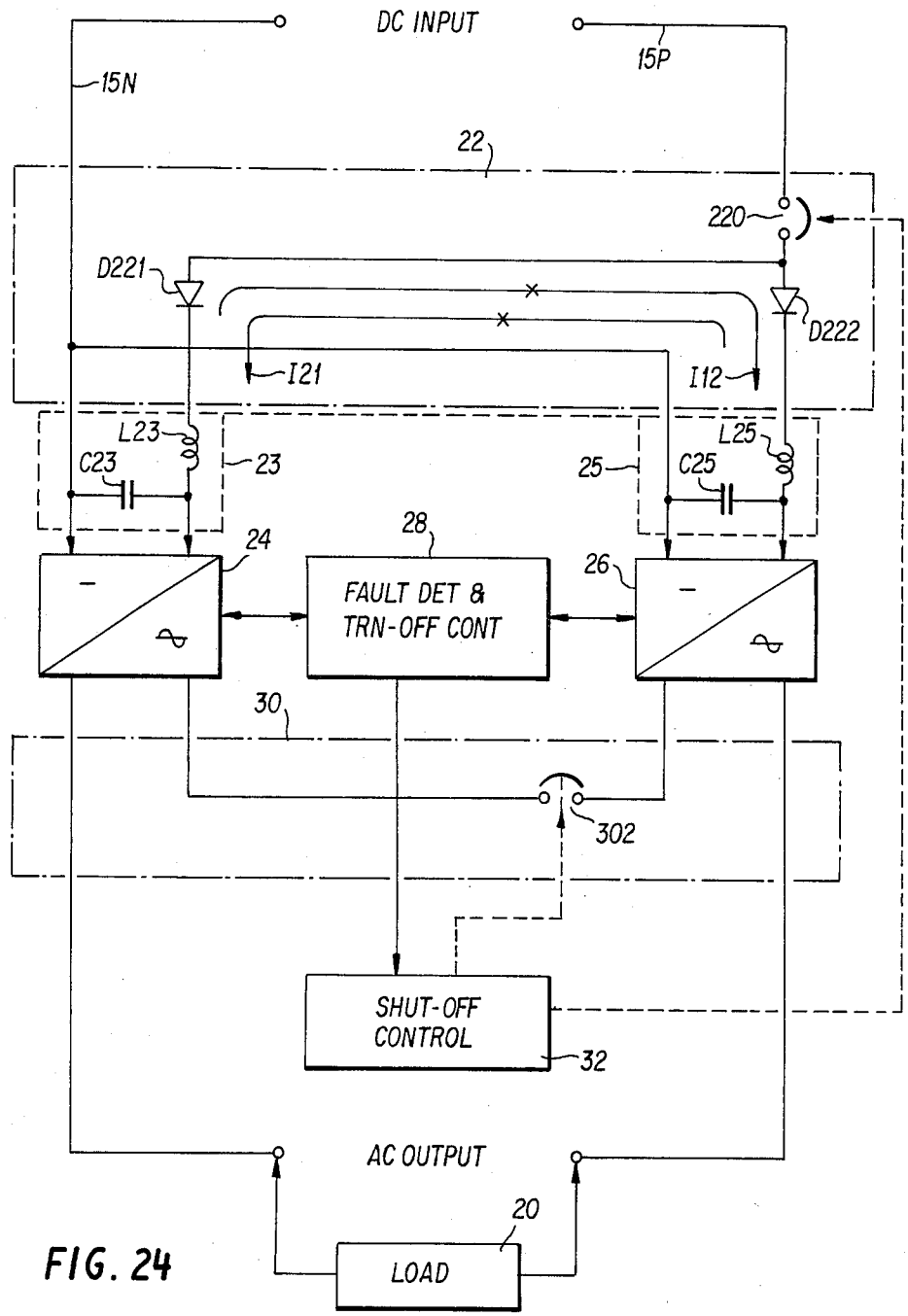
FIG. 24 is a modification of FIG. 7 showing the filter cut of system of FIG. 8.

FIG. 23 shows a case where a phase shifter 210 is provided between the proportion amplifier 184 and the control device 186 of FIG. 18. The configuration of phase shifter 210 may be a conventional one as shown on page 58, FIG. 4.21 of a Silicon Controlled Rectifier manual (General Electric Co., USA). FIG. 23 has the same configuration as FIG. 18 except that the inverted input of amplifier 184 receives a given positive voltage +Vs via a series circuit of a resistor R191 and a switch 188. When the configuration of FIG. 16 detects a shoot-through, the switch 188 is turned on so that the AC output voltage of the multiple inverter decreases.

In a multiple inverter according to the present invention, since all normal unit inverters are first turned off, and subsequently, breakers coupled to the DC input lines of the unit inverters are cut off, even if a shoot-through occurs, the double shut-off actuations of the unit inverters and breakers will prevent an accidental or faulty overcurrent without using expensive high-speed breakers.

What is claimed is:

1. A multiple inverter comprising:
    input shut-off means for receiving a DC energy input of the multiple inverter and providing two or more DC outputs wherein said input shut-off means includes at each DC input circuit of said unit inverters a chopper circuit, each of said chopper circuits allowing a current of said DC energy input to pass therethrough but blocking a current from one of said unit inverters to another unit inverter;
    two or more unit inverters coupled to said input shut-off means for respectively converting said DC outputs into two or more AC outputs, each of said unit inverters including switching elements; and
    control means coupled to at least one of said unit inverters for detecting an accidental or faulty overcurrent due to a shoot-through of said switching elements and for turning off said unit inverter, wherein a current path of said DC energy input is interrupted by said input shut-off means when the control means detect said accidental overcurrent.

2. A multiple inverter comprising:
    input shut-off means for receiving a DC energy input of the multiple inverter and providing two or more DC outputs wherein said input shut-off means includes at each DC input circuit of said unit inverters a unidirectional current conductor, each of said udrirectional current conductors allowing a current of said DC energy input to pass therethrough but blocking a current from one of said unit inverters to another unit inverter;
    two or more unit inverters coupled to said input shut-off means for respectively converting said DC outputs into two or more AC outputs, each of said unit inverters including switching elements; and
    control means coupled to at least one of said unit inverters for detecting an accidental or faulty overcurrent due to a shoot-through of said switching elements and for turning off said unit inverter, wherein a current path of said DC energy input is interrupted by said input shut-off means when the control means detects said accidental overcurrent.

3. The multiple inverter of claim 2 wherein said input shut-off means includes a plurality of shut-off circuits, and each of said shut-off circuits is provided with two or more of said unit inverters.

4. The multiple inverter of claim 3 wherein said control means includes:
    a current sensor coupled to the DC input circuit of at least one of said unit inverters for sensing said accidental overcurrent;
    a trigger circuit coupled to said current sensor for generating a trigger pulse when said accidental overcurrent is sensed by said current sensor; and
    a turn-off control circuit being responsive to said trigger pulse and coupled to said trigger circuit and to the switching elements of said unit inverters, for turning off all switching elements of one of said unit inverters which avoid said accidental overcurrent when said trigger pulse is generated.

5. The multiple inverter of claims 2 or 1, further comprising a reactor coupled in series to at least one of the DC input circuits of said unit inverters.

6. The multiple inverter of claim 5 wherein said control means includes:
    a current sensor coupled to the DC input circuit of at least one of said unit inverters for sensing said accidental overcurrent;
    a trigger circuit coupled to said current sensor for generating a trigger pulse when said accidental overcurrent is sensed by said current sensor;-and
    a turn-off control circuit being responsive to said trigger pulse and coupled to said trigger circuit and to the switching elements of said unit inverters, for turning off all switching elements of one of said unit inverters which avoid said accidental overcurrent when said trigger pulse is generated.

7. The multiple inverter of claims 2 or 1 wherein said control means includes:
    a current sensor coupled to the DC input circuit of at least one of said unit inverters for sensing said accidental overcurrent;
    a trigger circuit coupled to said current sensor for generating a trigger pulse when said accidental overcurrent is sensed by said current sensor; and
    a turn-off control circuit being responsive to said trigger pulse and coupled to said trigger circuit and to the switching elements of said unit inverters, for turning off all switching elements of one of said unit inverters which avoid said accidental overcurrent when said trigger pulse is generated.

8. The multiple inverter of claim 7 wherein said control means further includes:
    second shut-off means coupled to said input shut-off means for causing the interruption of a current flow of said DC energy input.

9. The multiple inverter of claim 8 wherein said second shut-off means is further coupled to said output shut-off means and causes the cutting off of the AC output current path of said unit inverters.

10. The multiple inverter of claim 7 wherein said switching elements include gate-turn-off thyristors.

11. The multiple inverter of claim 10 wherein said switching elements are four in number and these four elements constitute a bridge configuration in which one pair of bridge terminals receives said DC energy input and the other pair of bridge terminals provides said AC output.

12. The multiple inverter of claim 7 wherein said switching elements include bipolar transistors.

13. The multiple inverter of claim 12 wherein said switching elements are four in number and these four elements constitute a bridge configuration in which one pair of bridge terminals receives said DC energy input and the other pair of bridge terminals provides said AC output.

14. A plurality of multiple inverters in claims 2 or 1, wherein two or more of said multiple inverters are parallel-operated, being further comprised of:
   voltage sensor means coupled to the AC outputs from said unit inverters for generating a feedback voltage which corresponds to an AC output voltage of said multiple inverters;
   comparator means coupled to said voltage sensor means and having means for receiving a reference voltage, for generating a compared signal which corresponds to the difference between said feedback voltage and said reference voltage; and
   variable gain means coupled to said comparator means for amplifying said compared signal with a variable gain factor and said variable gain means having,
      means to provide a voltage control signal, and
      means for altering said AC output voltage based upon said voltage control signal; and
   sensor means included in said control means and coupled to said variable gain means for changing said variable gain factor when said shoot-through occurs in any of said multiple inverters, so that a decrease in said AC output voltage is cancelled by an increase in the AC output of another multiple inverter.

15. The multiple inverter of claims 2 or 1 which is further comprised of:
   voltage sensor means coupled to the AC outputs from said unit inverters for generating a feedback voltage which coresonds to an AC output voltage from said multiple inverter;
   comparator means coupled to said voltage sensor means and having means for receiving a reference voltage for generating a compared signal which corresponds to the difference between said feedback voltage and said reference voltage; and
   variable gain means coupled to said comparator means, for amplifying said compared signal with a variable gain factor and said variable gain means having,
      means to provide a separate voltage control signal, and
      means for altering said AC output voltage based upon said voltage control signal; and
   sensor means included in said control means and coupled to said variable gain means, for changing said variable gain factor when said shoot-through occurs in any of said unit inverters, so that a decrease in said AC output voltage is controlled by an increase in the AC output of another unit inverter, until the current path of said DC energy input is interrupted.

16. The multiple inverter of claims 2 or 1 which is further comprised of:
   voltage sensor means coupled to a circuit of the AC outputs from said unit inverters for generating a feedback voltage which corresponds to an AC output voltage from said multiple inverter; and
   variable gain comparator means coupled to said voltage sensor means and having means for receiving a reference voltage for detecting a difference signal which corresponds to the difference between said feedback voltage and said reference voltage, and said variable gain comparator means having,
      means for amplifying said difference signal with a variable gain factor to provide a voltage control signal,
      means for altering said AC output voltage based upon said voltage control signal; and
   sensor means included in said control means and coupled to said variable gain comparator means for changing said variable gain factor when said shoot-through occurs in any of said unit inverters, and adapted so that said AC output voltage traces a counter-electromotive force from a load connected to the AC output of said multiple inverter.

17. The multiple inverter of claims 2 or 1 which is further comprised of:
   voltage sensor means coupled to a circuit of the AC outputs from said unit inverters, for generating a feedback voltage which corresponds to an AC output voltage from said multiple inverter;
   comparator means coupled to said voltage sensor means and having means for receiving a reference voltage, for generating a compared signal which corresponds to the difference between said feedback voltage and said reference voltage; and
   variable voltage means coupled to said comparator means, for changing the voltage of said compared signal with a variable voltage factor to provide a voltage control signal, said variable voltage means having means to alter said AC output voltage based on said voltage control signal; and
   sensor means included in said control means and coupled to said variable voltage means, for changing said variable voltage factor when said shoot-through occurs in any of said unit inverters, so that said AC output voltage may be decrease.

* * * * *